US006917573B2

(12) United States Patent
Nakajo et al.

(10) Patent No.: US 6,917,573 B2
(45) Date of Patent: Jul. 12, 2005

(54) DISK APPARATUS FOR DRIVING DIFFERENT KINDS OF OPTICAL DISKS AND A METHOD FOR IDENTIFYING PERFORMANCE CHARACTERISTICS FOR A PARTICULAR OPTICAL DISK INSTALLED IN THE DISK APPARATUS

(75) Inventors: Hironori Nakajo, Kanagawa-ken (JP); Masayuki Tamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 223 days.

(21) Appl. No.: 10/367,975

(22) Filed: Feb. 19, 2003

(65) Prior Publication Data

US 2004/0071075 A1 Apr. 15, 2004

(30) Foreign Application Priority Data

Feb. 19, 2002 (JP) ..................................... P2002-041378

(51) Int. Cl.[7] ................................................ G11B 7/00
(52) U.S. Cl. ..................... 369/53.37; 369/47.1; 369/292
(58) Field of Search ........................... 369/47.1, 47.15, 369/53.1, 53.2, 53.37, 53.45, 59.1, 272.1, 292

(56) References Cited

U.S. PATENT DOCUMENTS 5,983,318 A * 11/1999 Willson et al. .......... 369/30.31
6,265,043 B1 * 7/2001 Vinyard et al. ............ 428/40.1
6,860,048 B2 * 3/2005 Foster et al. .................. 40/630

* cited by examiner

Primary Examiner—Muhammad Edun
(74) Attorney, Agent, or Firm—Pillsbury Windthrop Shaw Pittman LLP

(57) ABSTRACT

Multi-drive optical disk apparatus and a method and a label for easily confirming the respective performance characteristics for the different kinds of optical disks are provided. The respective performances, such as a data transfer rate are indicated by multiple-fold speed forms, respectively. The performance indication label is affixed on one surface of the optical disk drive. The performance indication label is constructed by arranging an indication for a data reading performance from a CD-ROM disk and a DVD-ROM disk, an indication for a data writing performance to a CD-RW disk, a DVD-RAM disk, a DVD-RW disk, a DVD-R disk, and a CD-R disk, and an indication for a data writing and reading performances to and from a DVD-RAM disk in a hypothetical circle.

20 Claims, 4 Drawing Sheets

DISK APPARATUS FOR DRIVING DIFFERENT KINDS OF OPTICAL DISKS AND A METHOD FOR IDENTIFYING PERFORMANCE CHARACTERISTICS FOR A PARTICULAR OPTICAL DISK INSTALLED IN THE DISK APPARATUS

CROSS-REFERENCE TO RELATED APPLICATIONS

This application claims the benefit of priority from Japanese Patent Application No. 2002-41378, filed on Feb. 19, 2002, which is hereby incorporated by reference in its entirety.

FIELD OF THE INVENTION

The present invention relates to a disk apparatus for driving a plurality of different kinds of optical disks and a method for identifying performance characteristics for a particular optical disk installed in the disk apparatus.

BACKGROUND OF THE INVENTION

Optical disks, such as a compact disk (CD) and a digital versatile disk (DVD), are widely used in electronic equipment for recording and reproducing audio and video information in a high density format. CDs may be used as a recording medium for storing audio information in a high density format. DVDs may be used as a recording medium for storing video information, since a DVD can store more information in a higher density format than a CD.

To meet various requirements for recording information in a high density format and reproducing it, various kinds of CDs and DVDs have been developed. For example, as optical disks of a CD-group, a CD read-only memory (CD-ROM) disk, a CD-recordable (CD-R) disk, and a CD re-writable (CD-RW) disk have been developed. As optical disks of a DVD-group, a DVD-ROM disk for using a read only memory, a DVD-recordable (DVD-R) disk, a DVD re-recordable (DVD-RW) disk, and a DVD re-writable (DVD-RAM) disk have been developed.

To commonly drive the various optical disks, a multi-drive-type disk apparatus has recently been developed in order to write and read information to and from each of the various types of optical disks.

In order to drive a particular type of optical disk, the multi-drive-type disk apparatus needs to identify a predetermined performance characteristic, such as a data transfer rate, for each of the particular optical disks installed in the disk apparatus. Generally, the optical disks of the CD group have a one-fold speed of 150 kilo-bits per second ("Kb/sec") as a standard speed of the data transfer rate. Usually, each of the CD-group's optical disks is defined by a respective transfer rate by indicating several times-fold speed of the standard speed. For example, the transfer rate for a CD-ROM is usually indicated as a "12-times speed". This means that when the disk apparatus reads information from the CD-ROM installed in it, the reading operation is preformed at a maximum transfer rate of 1.8 mega bits per second (1.8 Mb/sec).

Similarly, each of DVD disks in the DVD-group have a one-fold speed of about 1,352 Kb/sec as a standard data transfer rate. A particular transfer rate for each of the DVD disks is also indicated at several times that of the standard speed. For example, a transfer rate for DVD-ROM is indicated as a "16 times-fold speed". This means that when the disk apparatus reads information from the DVD-ROM optical disk installed in it, it is guarantees to be performed the reading operation is preformed at a maximum transfer rate of about 21,632 Kb/sec.

Usually, such performance characteristics for the respective optical disks are indicated by the maximum transfer rate. For instance, the maximum transfer rate, i.e. performance for a CD-ROM is indicated as a 12 times speed; the performance for a DVD-ROM is indicated as a 4 times-fold speed; similarly, a CD-R is indicated as a 8 times speed; a CD-RW is indicated as a 5 times speed; a DVD-R is indicated as a 2 times speed; and a DVD-RW is indicated as a 1 times speed, i.e., a standard speed. This performance indication is inevitable to determine its accurate speed for performing writing and reading operations to and from a particular type of optical disk.

Conventionally, these data transfer rates for the respective optical disks are indicated by a multiple-fold speed of the standard speed, only in a catalog or a manual for the multi-drive-type disk apparatus. However, there are no indications of the performances or the respective data transfer rates for the respective optical disks on the multi-drive-type disk apparatus itself or on a package for the disk apparatus. Consequently, in every operation time, it needs to refer to the catalog or the manual of the multi-drive-type optical disk apparatus in order to confirm the driving function. The more the multi-drive-type disk apparatus increases its writing and reading functions for supporting drives of optical disks, the more the problem appears for distinguishing each performance for the respective optical disks. Thus, it becomes hard to easily identify a particular performance for a particular optical disk, since its catalog or manual enumerates merely numerals of the multiple-fold speed and characters for indicating types of optical disks.

SUMMARY OF THE INVENTION

The present invention intends to solve the above-mentioned problems and defects for identifying a particular performance for a particular optical disk for the multi-drive-type disk apparatus. Accordingly, the present invention provides a disk apparatus attaching a performance indicating label for easily distinguishing respective performance characteristics for each of the various types of optical disks, each having a particular performance indicated by a multiple speed in order to easily confirm respective writing and reading performances for driving each of optical disks supported by the disk apparatus. Embodiments consistent with the present invention provide such performance indicating labels for attaching the multi-drive-type optical disk apparatus itself or a package for the optical disk apparatus. Also, the present invention can easily confirm respective reading and writing performance for each optical disk Consistent with the present invention, there is provided an optical disk apparatus, comprising: an optical disk drive unit having at least one of data writing and reading functions to and from at least one of a plurality of different kinds of optical disks including CD group disks and DVD group disks; and a performance indication label affixed on one surface of the optical disk apparatus for identifying performances for the respective plurality of different kinds of optical disks which are respectively represented in a plurality of performance notation areas corresponding to each of the plurality of different kinds of optical disks; wherein the plurality of notation areas for indicating respective performance characteristics for the respective plurality of different kinds of optical disks being arranged on a hypothetical circle in the performance indication label under a particularly defined rule for easily understanding the differences among the plurality of different kinds of optical disks.

Also consistent with the present invention, there is provided an optical disk apparatus, comprising an optical disk apparatus having a data read function from a CD-ROM disk, a data write function to a CD-R disk, a data write function to a CD-RW disk, a data read function from a DVD-ROM disk, a data write function to a DVD-R disk, a data write function to a DVD-RW disk, a data read function from a DVD-RAM disk and a data write function to a DVD-RAM disk; and a performance indication label attached on a surface of the optical disk drive unit. The performance indication label representing a first numeral for indicating a data transfer rate for the data read function from the CD-ROM disk, a second numeral for indicating a data transfer rate for the data write function to the CD-R disk, a third numeral for indicating a data transfer rate for the data write function to the CD-RW disk, a fourth numeral for indicating a data transfer rate for the data read function from the DVD-ROM disk, a fifth numeral for indicating a data transfer rate for the data write function to the DVD-R disk, a sixth numeral for indicating a data transfer rate for the data write function to the DVD-RW disk, a seventh numeral for indicating a data transfer rate for the data write function to the DVD-RAM disk and a symbol for indicating a data read function from the DVD-RAM disk that are arranged on a hypothetical circle.

Further consistent with the present invention, there is provided a packaged unit comprising an optical disk drive apparatus having data writing and data reading functions to and from the different kinds of optical disks; and a performance indication label affixed on a surface of the package, the performance indication label including a plurality of notation areas for identifying each performance characteristic for the respective optical disks.

BRIEF DESCRIPTION OF THE DRAWINGS

The accompanying drawings, which are incorporated in and constitute part of this specification, illustrate various embodiments and/or features of the invention and together with the description, serve to explain the invention. Wherever possible, the same reference numbers will be used throughout the drawings to the same or the like parts. In the drawings.

DETAILED DESCRIPTION OF EMBODIMENTS OF THE INVENTION

Figure 1:
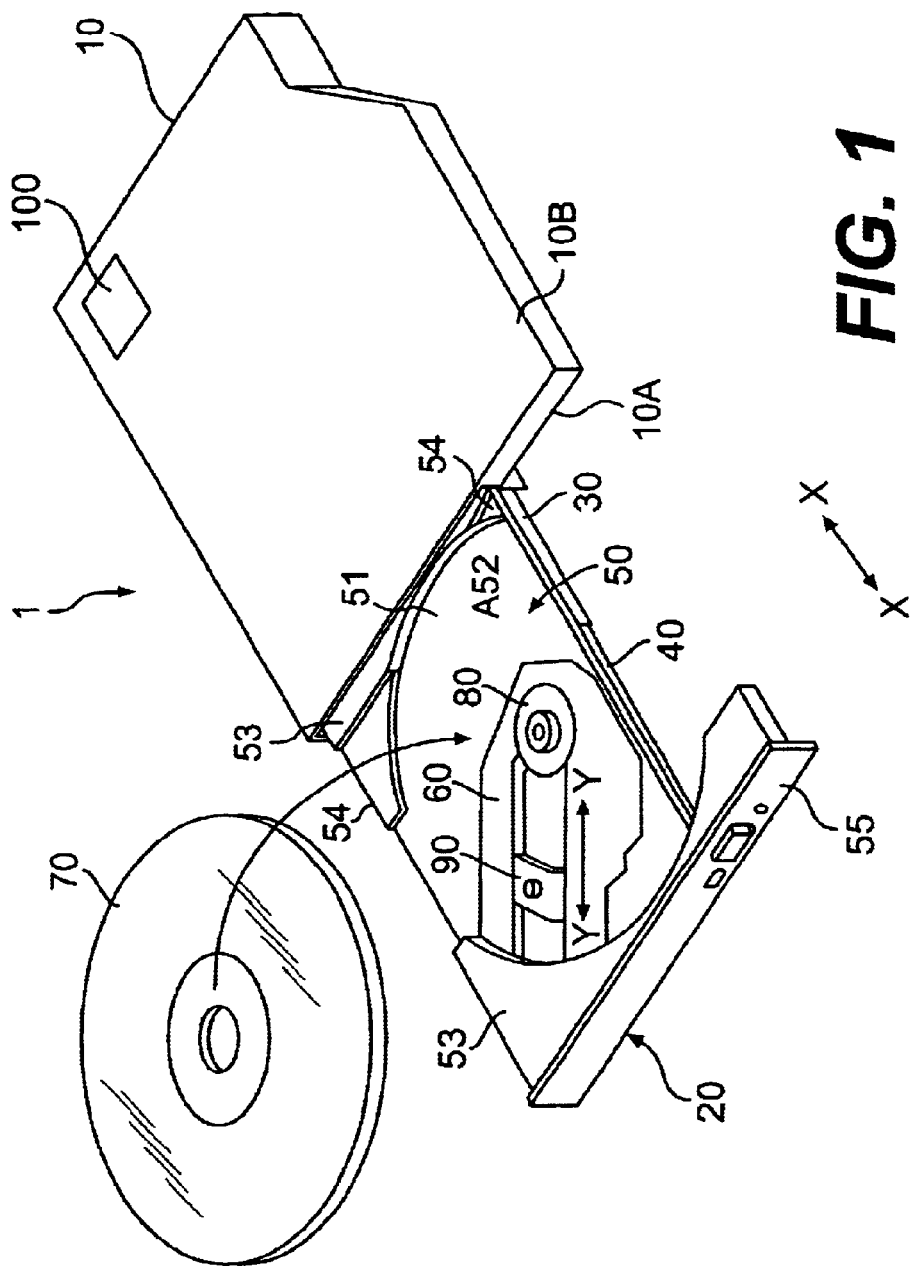
FIG. 1 is a perspective view of an exemplary configuration a multi-drive-type optical disk apparatus in which methods and apparatus consistent with the present invention may be implemented.

Reference will now be made in detail to the exemplary embodiments of the present invention, examples of which are illustrated in the accompanying drawings. Wherever possible, the same reference numbers will be used throughout the drawings to refer to the same or like parts. FIG. 1 illustrates a multi-optical disk drive unit in which methods and apparatus consistent with the present invention may be implemented. The multi-drive-type optical disk apparatus 1 consistent with the present invention includes an optical disk drive unit 10 and a performance indicating label 100 attached on at least one surface of the disk drive unit 10. The optical disk apparatus 1, consistent with the present invention, has a reading function from a CD-ROM optical disk, a writing function to a CD-R optical disk and a CD-RW optical disk, a data reading function from a DVD-ROM optical disk, a data writing function to a DVD-R optical disk and a DVD-RW optical disk, a data reading from a DVD-RAM optical disk, and a writing function to a DVD-RAM optical disk.

For example, the optical disk apparatus 1 consistent with the present invention may have a particular performance for driving the CD-ROM optical disk that the data transfer rate is a 24 times speed, i.e., 3,600 kilo-bit per second ("kb/sec"), a particular data transfer rate for a CD-R optical disk of a 16 times speed and a particular data transfer rate for a CD-RW optical disk of a 10 times speed. Further, the optical disk apparatus 1 consistent with the embodiment of the present invention may have a particular data transfer rate for a DVD-ROM optical disk of a 8 times speed (i.e., about 10,816 kb/sec), a particular performance for a DVD-R optical disk of a 2 times speed, a particular data transfer rate for a DVD-RW optical disk of a standard-speed, and a particular data transfer rate for a DVD-RAM optical disk of a double-speed.

Of course, the disk apparatus 1 consistent with the invention is not limited to the above-mentioned type of optical disk driving apparatus. The present invention is also applicable to another types of disk apparatus having data writing and reading functions for another types of optical disks, such as a Magneto Optical (MO) disk and a next generation DVD.

Referring to FIG. 1, the disk drive 1 includes a box-shaped main body 10. The main body 10 contains a drawer unit 20 in it. Thus, the main body 10 includes a bottom plate 10A and a top plate 10B for covering the bottom plate 10A. The bottom and top plates construct an opening at one end of the main body in order to move the drawer unit 20 along the X—X directions. At an inside of the main body 10, a printed circuit board and connecting materials, such as a flexible cable and a solenoid, coupled to the printed circuit board are provided at an opposite end of the opening.

The drawer unit 20 can be moved along the X—X directions by using a sliding mechanism provided in the main body 10. FIG. 1 illustrates only one portion of the sliding mechanism. Thus, the sliding mechanism includes a pair of sliding-holders 30 provided at both side edges on the bottom plate 10A. The drawer unit 20 includes a pair of slide elements 40, each of which is coupled to each of the sliding-holders so as to freely move the drawer unit 20 in the main body 10 as indicated by the bi-directional arrows X—X.

The drawer unit 20 further includes a drawer frame 50 which includes a substantially circle-shaped area A52 adjacent to a plane 51. An optical disk 70 is set at the circle-shaped area A52 in the drawer frame 50. For instance, one of among a CD-ROM optical disk, a CD-R optical disk, a CD-RW optical disk, a DVD-ROM optical disk, a DVD-R optical disk, a DVD-RW optical disk, and a DVD-RAM optical disk, is provided at the circle-shaped area A52.

Around the circle-shaped area A52, a disk height controller 54 is formed in one unit around a circumference part 53 so that it might rise up at least one portion of the circumference part 53. The height of the disk height controller 54 is formed so as to maintain a substantially same height of the optical disk surface when the optical disk is chucked at a predetermined position in the circle-shaped area A52.

The drawer frame 50 includes an opening at a center part of the plane surface 51. A chassis 60 is provided so as to cover the opening at the substantially same surface of the plane surface 51. The chassis 60 includes an opening for exposing a turning table 80 in order to drive the optical disk 70. Under the chassis 60, a disk motor (not shown) is provided to rotate the turning table 80.

Further the chassis 60 includes a slit opening so as to pass a light beam emitted from an optical head in the pick-up unit 90. Namely, the pick-up unit 90 can move a backward and a forward along an elongated direction of the slit opening, as indicated by the bi-directional arrow Y—Y, at an underside of the chassis 60. To move the pick-up unit 90, a shaft, a gear mechanism and a feed motor (not shown) may be provided under the chassis 60, and flexible cables and printed circuit boards are used for electrically coupling among them. When the drawer body 20 is inserted into the main body 10, a front plate 55 of the drawer 20 closes the opening of the main body 10.

An embodiment consistent with the invention includes a performance indication label 100 being affixed on one surface of the main body 10 of the optical disk apparatus 1. The performance indication label 100 identifies each writing and reading performances for each types of optical disks. FIG. 1 illustrates an embodiment of the label 100 that is affixed on the top plate 10B. Of course, it is possible to affix the performance indication label 100 on another surface of the main body 10. For example, the performance indication label 100 can be affixed a side surface or the bottom surface 10A depending upon an easy looking situation.

Figure 2:
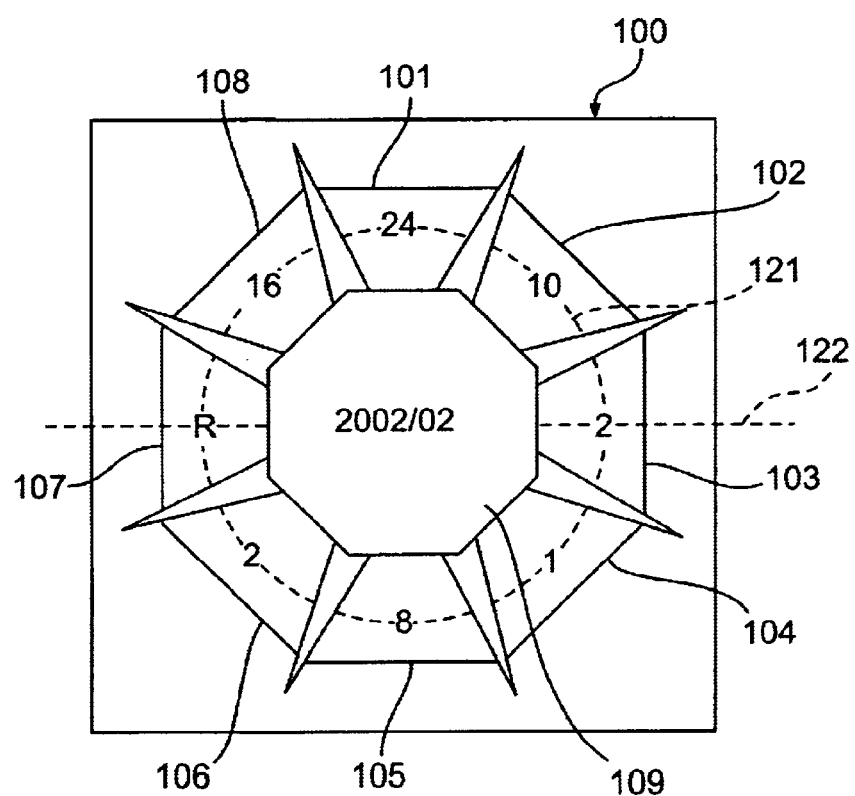
FIG. 2 illustrates an embodiment of a performance indicating label for attaching on the multi-drive-type optical disk apparatus in which methods consistent with the present invention may be implemented.

FIG. 2 illustrates an embodiment of a performance indication label 100 consistent with the present invention. As illustrated in FIG. 2, the performance indication label 100 includes a plurality of performance notation areas 101–108 that are arranged on a hypothetical circle 121. Each of the plurality of performance notation areas identifies a predetermined performance for respective kinds of optical disks to be installed in the disk apparatus 1. For example, the first area 101 indicates a performance for reading data from a CD-ROM disk. The second area 102 indicates a performance for writing data to a CD-RW disk. The third area 103 indicates a performance for writing data to a DVD-RAM disk. The fourth area 104 indicates a performance for writing data to a DVD-RW disk. The fifth area 105 indicates a performance for reading data from a DVD-ROM disk. The sixth area 106 indicates a performance for writing data to a DVD-R disk. The seventh area 107 indicates a performance for reading data from a DVD-RAM disk. And the eighth area 108 indicates a performance for writing data to a CD-R disk. Further, the performance indication label 100 includes a peculiar notation area 109 for indicating a peculiar data of the optical disk apparatus 1, such as a manufactured data of the apparatus or a manufacturing number, at a center part of the label. Thus, the peculiar notation area 109 is arranged at a central part that is encircled by the plurality of performance notation areas 101–108. In FIG. 2, as an example, the peculiar notation area 109 indicates a manufactured date of February, 2002 of the disk apparatus 1.

As illustrated in FIG. 2, according to the embodiment consistent with the present invention, each of the writing or reading performances for the respective notation areas 101–106, and 108 is indicated by a numeral representing a speed multiple for the respective data writing or reading performance for the respective optical disk. Thus, the reading performance from a CD-ROM is indicated as a 24 times speed. The writing performance to a CD-RW is indicated as a 10 times speed. The writing performance to a DVD-RAM is indicated as a 2 times speed. The writing performance to a DVD-RW is indicated as a 1 times speed, i.e., the standard speed. The reading performance from a DVD-ROM is indicated as a 8 times speed. And the writing performance to a DVD-R is indicated as a 2 times speed. Further, when the optical disk apparatus 1 has a data reading function from a DVD-RAM optical disk, the performance notation area 107 allotted for the DVD-RAM indicates a symbol "R". Of course, it is possible to indicate the data writing or reading performance by a numeral representation other than the multiple-fold speed. Further, it is possible to use other symbol than the "R" for noting data reading function from a DVD-RAM disk.

As illustrated in FIG. 1, the performance indicating label 100 is directly affixed on one surface of the main body 10 of the optical disk apparatus 1. Accordingly, a user can easily understand the predetermined performance for the respective optical disks by looking at the performance indicating label 100 affixed on the multi-drive optical disk drive 1. Thus, the user can easily understand, for example, that a data reading performance from a DVD-ROM disk is performed by a 8 times speed, a data writing performance to a CD-RW disk is achieved by a 10 times speed, and so on.

In the embodiment illustrated in FIG. 2, the third notation area 103 indicating a data writing performance to a DVD-RAM disk and the seventh notation area 107 for indicating data reading function from a DVD-RAM disk are arranged on a hypothetically horizontal bisector 122 of the hypothetical circle 121 on which the plurality of performance notation areas 101–108 are arranged in the performance indication label 100. Thus, the hypothetical bisector 122 divides the hypothetical circle 121 into an upper half circle and a lower half circle. In the upper half circle area, the performance notation areas for the CD group optical disks, i.e., a CD-ROM disk, a CD-R disk, a CD-RW disk, are arranged. On the other hand, the performance notation areas for the DVD group optical disks, i.e., a DVD-ROM disk, a DVD-R disk, a DVD-RW disk, are arranged in the lower half circle area. Thus, in the embodiment consistent with the present invention, the performance notation area 101 for indicating a data reading performance from a CD-ROM disk and the performance notation area 105 for indicating a data reading performance from a DVD-ROM are symmetrically arranged along the hypothetical bisector 122 in the disk indication label 100.

Similarly, the performance notation area 102 for indicating a data writing performance to a CD-RW disk and the performance notation area 104 for indicating a data writing performance to a DVD-RW are symmetrically arranged along the hypothetical bisector 122. Also, the performance notation area 108 for indicating a data writing performance to a CD-R disk and the performance notation area 106 for indicating a data reading performance from a DVD-R are symmetrically arranged along the hypothetical bisector 122. In the embodiment consistent with the present invention, both CD and DVD optical disks belonging in the same category are arranged in conformity with a rule in order to easily understand a particular performance for the respective optical disks. For example, CD and DVD disks of ROM group and optical disks of RAM group, CD and DVD disks of R group, and CD and DVD disks of RW group, are respectively arranged at a symmetrical position along the hypothetical bisector 122.

Of course, it is possible for the arrangement of the notations to apply another rule. For example, each of the ROM group, RAM group, R group and RW group can be respectively represented by a different color in order to easily understand the performance notation. Thus, the noted numerals or the symbol are represented by a different color for each of different types of optical disks, such as the ROM group, RAM group, R group and RW group. For example, in the embodiment illustrated in FIG. 2, the numeral "24" in the notation area 101 for indicating reading performance from a CD-ROM disk and the numeral "8" in the notation area 105 for indicating reading performance from a DVD-ROM may be represented by a white color. The numeral "10" in the notation area 102 for a CD-ROM disk and the numeral "1" in the notation area 104 for a DVD-ROM may be represented by an orange color. Further, the numeral "2" in the notation area 103 for a DVD-RAM disk and the symbol "R" in the reading availability notation area 107 for a DVD-RAM may be represented by a red color. Similarly, the numeral "16" in the notation area 108 for a CD-R disk and the numeral "2" in the notation area 106 for a DVD-R may be represented by a yellow color.

Further, it may be possible to change the numeral writing style for the respective notation for the respective groups. Of course, it is possible to modify the arrangement of the notation areas in a different position other than the arrangement shown in FIG. 2. Furthermore, it is also possible to affix the performance indication label by directly marking a carved seal on a surface of the main body of the optical disk apparatus 1.

Figure 3:
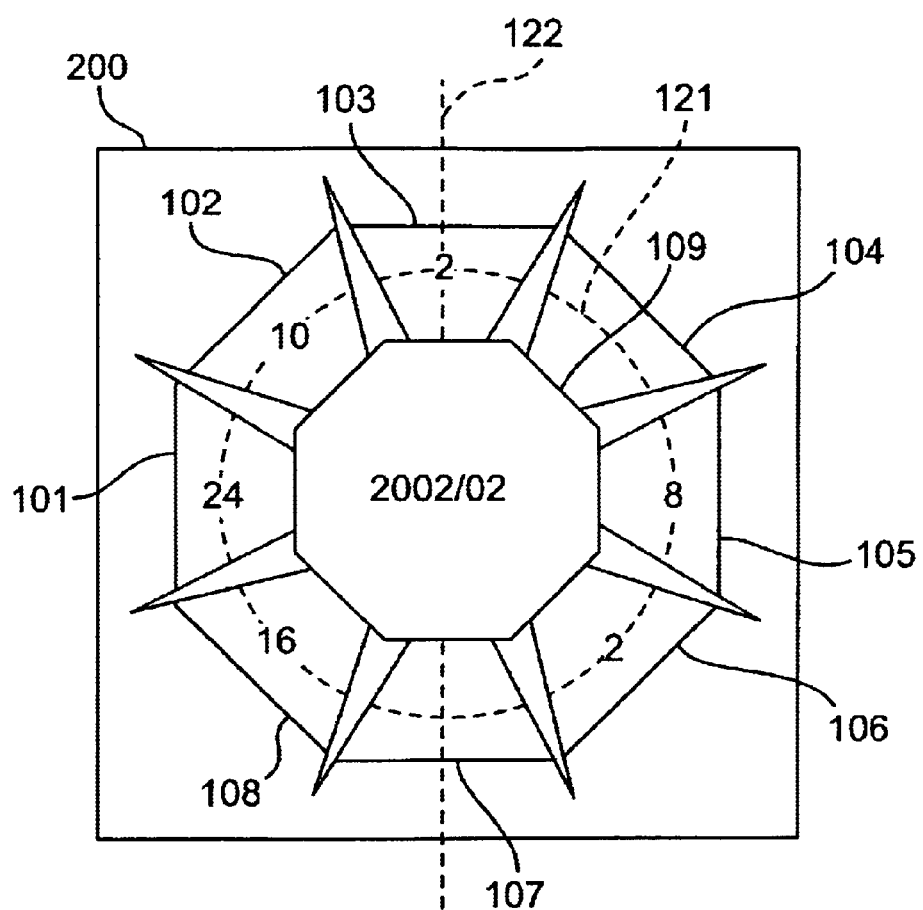
FIG. 3 illustrates another embodiment of a performance indicating label attaching on the multi-drive-type optical disk apparatus in which methods consistent with the present invention may be implemented.

FIG. 3 illustrates another embodiment of the performance indicating label 200. In this embodiment, each notation areas 101–108 are arranged at a position which has been the corresponding notation areas shown in FIG. 2 have been rotated by 90 degrees. Accordingly, the notation area 103 and the notation area 107 are arranged on a vertical bisector 122. Thus, the hypothetical bisector 122 vertically divides the hypothetical circle 121 into a left-side half circle and a right-side half circle. In the left-side half circle area, the performance notation areas for the CD group optical disks, i.e., a CD-ROM disk, a CD-R disk, a CD-RW disk, are arranged. On the other hand, the performance notation areas for the DVD group optical disks, i.e., a DVD-ROM disk, a DVD-R disk, a DVD-RW disk, are arranged in the right-side half circle area.

Further, as illustrated in FIG. 3, the notation area 104 and 107 in this embodiment of the performance indicating label 100 are remained as a blank without representing any numeral nor symbol. These blank areas indicate that the disk apparatus affixing this performance indication label 100 does not include the functions corresponding to the blank areas 104 and 107. Thus, this disk apparatus does not have the function for writing data to a DVD-RW disk or the function for reading data from a DVD-RAM disk. As illustrated as an example, when the optical disk apparatus 1 does not have some of functions, the corresponding notation areas are maintained as a blank.

Figure 4:
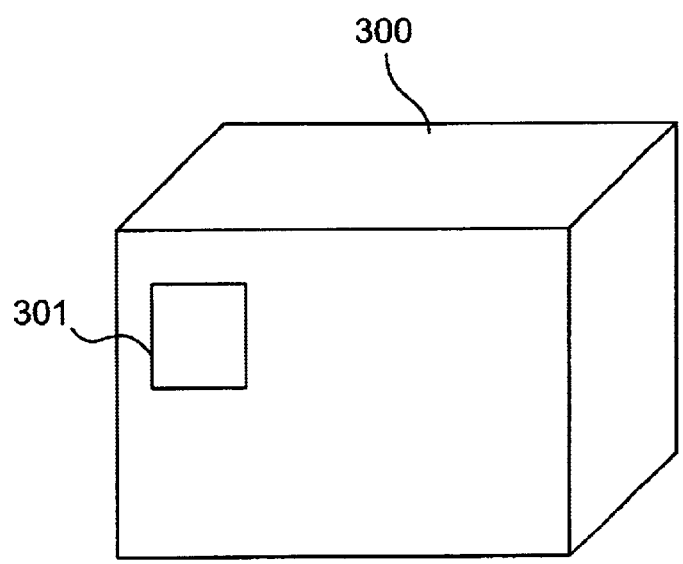
FIG. 4 is a perspective view of an exemplary configuration of a package with attaching the performance indicating label for the multi-drive-type optical disk apparatus in which methods and apparatus consistent with the present invention may be implemented.

FIG. 4 illustrates a further embodiment consistent with the invention. The performance indication label 301 is also affixed on a surface of a package for the optical disk apparatus 1 as shown in FIG. 1. The package 300 can packed up one or more sets of the optical disk apparatus. Usually, the package for the optical disk apparatus indicates only a manufacturer name and type number of the apparatus. Thus the performance notations for the respective optical disks are not represented on the package box 300. According to this embodiment consistent with the present invention, by looking at the performance indication label 100, a user can understand particular performances involved in the disk apparatus without checking the disk apparatus itself or a manual enclosed in the package 300 thereby not having to unpack the package 300. Of course, it is also possible to directly print the performance indication label 100 on a surface of the package 300.

As explained above, the described multi-drive-type optical disk apparatus and method for indicating performance for the disk apparatus can easily recognize the respective reading or writing performances for each of the various kinds of optical disks. Thus, the present invention can provide apparatus and method for easily confirming the respective reading or writing performances in the multi-drive-type optical disk apparatus by looking at the affixed noble performance notation label.

Other embodiments of the invention will be apparent to those skilled in the art from consideration of the specification and practice of the invention disclosed herein. It is intended that the specification and examples be considered as exemplary only, with a true scope and sprit of the invention being indicated by the following claims.

What is claimed is:

1. An optical disk apparatus, comprising:

an optical disk drive unit having at least one of data writing and reading functions to and from at least one of a plurality of different kinds of optical disks including CD group disks and DVD group disks; and a performance indication label affixed on one surface of the optical disk apparatus for identifying each performance characteristic for the respective plurality of different kinds of optical disks which are respectively represented in a plurality of performance notation areas corresponding to each of the plurality of different kinds of optical disks;

wherein the plurality of notation areas for indicating respective performance characteristics for the respective plurality of different kinds of optical disks being arranged on a hypothetical circle in the performance indication label under a particularly defined rule for easily understanding the differences among the plurality of different kinds of optical disks.

2. The optical disk apparatus according to claim 1, wherein the plurality of notation areas for the CD group disks and the plurality of notation areas for the DVD group disks may be arranged on one of half circles dividing the hypothetical circle by a hypothetical bisector.

3. The optical disk apparatus according to claim 2, wherein the plurality of notation areas for the CD group disks including a first notation area for a CD-ROM disk, a second notation area for a CD-R disk, and a third notation area for a CD-RW disk; and the plurality of notation areas for the DVD group disks including a first notation area for a DVD-ROM disk, a second notation area for a DVD-R disk, a third notation area for a DVD-RW disk, and a fourth notation area for a DVD-ROM disk.

4. The optical disk apparatus according to claim 3, wherein the plurality of notation areas for the DVD group disks further includs a fourth notation area for indicating writing performance to a DVD-RAM disk, and a fifth notation area for indicating reading function from a DVD-RAM disk, wherein the fourth and fifth notation areas for DVD-RAM disk are arranged on the hypothetical bisector.

5. The optical disk apparatus according to claim 4, wherein the fourth notation area for DVD-RAM indicates a fourth numeral for representing a data transfer rate and the fifth notation area for DVD-RAM disk indicates a symbol for representing a reading availability from the DVD-RAM.

6. The optical disk apparatus according to claim 3, wherein each of the first, second and third pair of notation areas are arranged at a symmetrical position against the hypothetical bisector horizontally dividing the hypothetical circle.

7. The optical disk apparatus according to claim 3, wherein each of the first, second and third pair of notation areas are arranged at a symmetrical position against the hypothetical bisector vertically dividing the hypothetical circle.

8. The optical disk apparatus according to claim 3, wherein each of the first, second and third of notation areas for the CD disks indicating a first, second and third numerals for respectively representing a data transfer rate to or from a particular type of CD disk, and each of the first, second and third of notation areas for the DVD disks indicating a first, second and third numerals for respectively representing a data transfer rate to or from a particular type of DVD disk.

9. The optical disk apparatus according to claim 3, wherein each of a first pair of the first notation areas for CD-ROM and DVD-ROM, a second pair of the second notation areas for CR-R and DVD-R, and a third pair of the third notation areas for CD-RW and DVD-RW are arranged at a symmetrical position against the hypothetical bisector, respectively.

10. The optical disk apparatus according to claim 1, wherein each notation area including a first numeral for indicating a first transfer rate of data writing operation to an optical disk, a second numeral for indicating a second transfer rate of data reading operation from an optical disk, or a symbol for indicating an availability of data reading operation from a particular optical disk.

11. The optical disk apparatus according to claims 10, wherein the first, second and third numerals for indicating the first and second transfer rates are respectively presented by a multiple-fold speed applicable to the optical disk apparatus.

12. The optical disk apparatus according to claims 1, wherein the plurality of different kinds of optical disks includes a CD-ROM disk, a DVD-ROM disk and a DVD-RAM disk, from which the optical disk apparatus has data reading function, and a CD-R disk, a CD-RW disk, a DVD-R disk, a DVD-RW disk and a DVD-RAM disk, to which the optical disk apparatus has data writing function.

13. An optical disk apparatus, comprising:
an optical disk apparatus having a data read function from a CD-ROM disk, a data write function to a CD-R disk, a data write function to a CD-RW disk, a data read function from a DVD-ROM disk, a data write function to a DVD-R disk, a data write function to a DVD-RW disk, a data read function from a DVD-RAM disk and a data write function to a DVD-RAM disk; and
a performance indication label attached on a surface of the optical disk drive unit, wherein:
the performance indication label representing a first numeral for indicating a data transfer rate for the data read function from the CD-ROM disk, a second numeral for indicating a data transfer rate for the data write function to the CD-R disk, a third numeral for indicating a data transfer rate for the data write function to the CD-RW disk, a fourth numeral for indicating a data transfer rate for the data read function from the DVD-ROM disk, a fifth numeral for indicating a data transfer rate for the data write function to the DVD-R disk, a sixth numeral for indicating a data transfer rate for the data write function to the DVD-RW disk, a seventh numeral for indicating a data transfer rate for the data write function to the DVD-RAM disk and a symbol for indicating a data read function from the DVD-RAM disk that are arranged on a hypothetical circle.

14. The optical disk apparatus according to claims 13, wherein the first, second and third numerals for indicating the first and second transfer rates are respectively presented by a speed multiple applicable to the optical disk apparatus.

15. The optical disk apparatus according to claims 13, wherein the performance indicating label including the first, second and third numerals being arranged on one half circle of the hypothetical circle divided by a bisector, the fourth, fifth and sixth numerals being arranged on other half circle of the hypothetical circle, and the seventh numeral and the symbol being arranged on the hypothetical bisector.

16. The optical disk apparatus according to claims 13, wherein the performance indicating label including the first and fourth numerals being symmetrically arranged against the hypothetical bisector, the second and fifth numerals being symmetrically arranged against the hypothetical bisector, and the third and sixth numerals being symmetrically arranged against the hypothetical bisector.

17. The optical disk apparatus according to claims 13, wherein the first and fourth numerals in the performance indicating label are represented by a first form, the second and fifth numerals in the performance indicating label are represented by a second form that is different from the first form, the third and sixth numerals in the performance indicating label are represented by a third form that is different from the first and second forms, respectively and the seventh numeral and the symbol in the performance indicating label are represented by a fourth form that is different from the first, second and third forms, respectively.

18. The optical disk apparatus according to claims 13, wherein the performances for the CD-ROM disk and the DVD-ROM disk in the performance indicating label are represented by a first color, the performances for the CD-R disk and the DVD-R disk in the performance indicating label are represented by a second color that is different from the first color, the performances for the CD-RW disk and the DVD-RW disk in the performance indicating label are represented by a third color that is different from the first and second colors, respectively and the reading performance and the writing performance for the DVD-RAM disk in the performance indicating label are represented by a fourth color that is different from the first, second and third colors, respectively.

19. The optical disk apparatus according to claims 13, wherein the performance indicating label includes a manufacturing date of the optical disk drive that is represented at the center area of the hypothetical circle.

20. A packaged unit comprising;
an optical disk drive apparatus having data writing and data reading functions to and from different kinds of optical disks;
a package for packing the optical disk drive apparatus; and
a performance indication label affixed on a surface of the package, the performance indication label including a plurality of notation areas for identifying each performance characteristic for the respective optical disks.

* * * * *